US012759885B2

(12) United States Patent
Bracamonte et al.

(10) Patent No.: US 12,759,885 B2
(45) Date of Patent: Oct. 13, 2026

(54) COW HAIR-BASED POROUS BIOCHAR, SYNTHESIS PROCESS FOR OBTAINING SAID BIOCHAR, COW HAIR-BASED COMPOSITE ACTIVE MATERIAL, POSITIVE ELECTRODE COMPRISING SAID COMPOSITE ACTIVE MATERIAL, AND METHOD FOR PREPARING SAID POSITIVE ELECTRODE

(71) Applicants: YPF TECNOLOGÍA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR); UNIVERSIDAD NACIONAL DE CÓRDOBA, Ciudad de Córdoba Prov. de Cordoba (AR)

(72) Inventors: Victoria Bracamonte, Córdoba (AR); Guillermina Leticia Luque, Córdoba (AR); Cecilia Andrea Calderón, Córdoba (AR); Melina Cozzarin, La Plata Pcia. de Buenos Aires (AR); Fabio D. Saccone, Buenos Aires (AR); Jorge Javier Acosta, Ciudad Autónoma de Buenos Aires (AR); Leandro García Tsuruoka, La Plata Buenos Aires (AR); Jorge Enrique Thomas, La Plata Buenos Aires (AR); Ezequiel P. M. Leiva, Córdoba (AR); Daniel Barraco, San Isidro Villa Allende (AR)

(73) Assignees: YPF TECNOLOGÍA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR); UNIVERSIDAD NACIONAL DE CÓRDOBA, Ciudad de Córdoba Prov. de Cordoba (AR)

( * ) Notice: Subject to any disclaimer, the term of this patent is extended or adjusted under 35 U.S.C. 154(b) by 48 days.

(21) Appl. No.: 18/737,646

(22) Filed: Jun. 7, 2024

(65) Prior Publication Data

US 2024/0409416 A1 Dec. 12, 2024

Related U.S. Application Data

(60) Provisional application No. 63/507,374, filed on Jun. 9, 2023.

(51) Int. Cl.
*H01M 4/133* (2010.01)
*C01B 32/324* (2017.01)
(Continued)

(52) U.S. Cl.
CPC .......... *C01B 32/324* (2017.08); *C01B 32/348* (2017.08); *C01B 32/372* (2017.08);
(Continued)

(58) Field of Classification Search
CPC ............... H01M 4/133; H01M 4/1393; H01M 2004/028
See application file for complete search history.

(56) References Cited

FOREIGN PATENT DOCUMENTS

| | | | | |
|---|---|---|---|---|
| CN | 110148723 A | * | 8/2019 | .......... H01M 10/054 |
| CN | 111554888 A | | 8/2020 | |
| CN | 111554888 B | | 4/2022 | |

OTHER PUBLICATIONS

Chen et al., "Application of rabbit hair based hollow carbon fiber in lithium-sulfur battery", Fangzhi Xuebao/Journal of Textile Research, 42(3), Mar. 2021, pp. 56-63 (ISSN/ISBN 0253-9721).*

(Continued)

*Primary Examiner* — Khanh T Nguyen
(74) *Attorney, Agent, or Firm* — MUNCY, GEISSLER, OLDS & LOWE, P.C.

(57) ABSTRACT

A cow hair-based porous biochar for positive electrodes of lithium-sulfur batteries. The cow hair-based porous biochar (Continued)

includes carbon ranging from 85% to 95% by weight of the biochar and oxygen ranging from 5% to 15% by weight of the biochar. The carbon is arranged in a three-dimensional matrix defining a porosity for the biochar, and the porosity ranges from 60% to 80% of the total volume of the biochar. A synthesis process for obtaining said cow hair-based porous biochar, a cow hair-based composite active material for the preparation of positive electrodes for lithium-sulfur batteries, a positive electrode for a lithium-sulfur battery, and a method for preparing said positive electrode are also provided.

10 Claims, 11 Drawing Sheets

(51) Int. Cl.

| | |
|---|---|
| ***C01B 32/348*** | (2017.01) |
| ***C01B 32/372*** | (2017.01) |
| ***C01B 32/378*** | (2017.01) |
| ***H01M 4/1393*** | (2010.01) |
| ***H01M 4/587*** | (2010.01) |
| ***H01M 4/62*** | (2006.01) |
| *H01M 4/02* | (2006.01) |

(52) U.S. Cl.

CPC .......... *C01B 32/378* (2017.08); *H01M 4/133* (2013.01); *H01M 4/1393* (2013.01); *H01M 4/587* (2013.01); *H01M 4/623* (2013.01); *C01P 2002/72* (2013.01); *C01P 2002/82* (2013.01); *C01P 2002/88* (2013.01); *C01P 2004/80* (2013.01); *C01P 2006/12* (2013.01); *C01P 2006/16* (2013.01); *C01P 2006/40* (2013.01); *C01P 2006/80* (2013.01); *H01M 2004/028* (2013.01)

(56) References Cited

OTHER PUBLICATIONS

Li et al., "Sulfur encapsulated in porous carbon nanospheres and coated with conductive polyaniline as cathode of lithium-sulfur battery", Journal of Solid State Electrochemistry, 20(1), Jul. 2015, pp. 153-161 (ISSN/ISBN 1432-8488).*

Mingpeng Yu et al., "A graphene wrapped hair-derived carbon/sulfur composite for lithium-sulfur batteries" Jornal of Materials Chemistry A, 2015, 3, DOI: 10.1039/c5ta00651a, p. 9609-9615.

Juan Ren et al., "A reduced graphene oxide/nitrogen, phosphorus-doped porous carbon hybrid framework as sulfur host for high-performance lithium-sulfur batteries", Carbon (2018), DOI: 10.1016/j.carbon.2018.08.026, 42 pages.

Juan Ren et al., "Sulfur-encapsulated in heteroatom-doped hierarchical porous carbon derived from goat hair for high-performance lithium-sulfur batteries", Journal of Energy Chemistry, 2018, Science Press and Dalian Institute of Chemical Physics, Chinese Academy of Sciences. Published by Elsevier B.V. and Science Press, p. 121-131.

Jinzhi Song et al., Preparing Biochars from Cow Hair Waste Produced in a Tannery for Dye Wastewater Treatment, Materials 2021, 14, 1690., doi.org/10.3390/ma14071690, 14 pages.

* cited by examiner

COW HAIR-BASED POROUS BIOCHAR, SYNTHESIS PROCESS FOR OBTAINING SAID BIOCHAR, COW HAIR-BASED COMPOSITE ACTIVE MATERIAL, POSITIVE ELECTRODE COMPRISING SAID COMPOSITE ACTIVE MATERIAL, AND METHOD FOR PREPARING SAID POSITIVE ELECTRODE

CROSS REFERENCE TO RELATED APPLICATIONS

This application claims priority of U.S. Provisional Application No. 63/507,374 filed on Jun. 9, 2023 under 35 U.S.C. § 119(e), the entire contents of which are hereby incorporated by reference.

BACKGROUND OF THE INVENTION

Field of the Invention

The present invention relates to the technical field of lithium-sulfur batteries. More particularly, the present invention relates to a cow hair-based porous biochar, a synthesis process for obtaining said biochar, a cow hair-based composite active material, a positive electrode (or cathode) comprising said composite active material, and a method for preparing said positive electrode for a lithium-sulfur battery.

Brief Description of the Related Art

Lithium-sulfur battery technology is one of the most promising battery technologies today because of its technical, economic and environmental advantages. For this reason, there is a lot of research in order to improve its performance, including the use of positive electrodes comprising biochar which allows not only reducing the environmental impact but also having a high gravimetric capacity.

Patent application CN 111554888 A discloses a positive electrode material containing rabbit hair-based hollow carbon fibers for a lithium-sulfur battery and a preparation method of the positive electrode material, wherein the positive electrode material is prepared from four components including a sulfur/rabbit hair hollow carbon fiber composite material, carbon nanotubes, Super P and polyvinylidene fluoride. The positive electrode disclosed has a gravimetric capacity of about $$650\ \frac{\text{mAh}}{\text{g}}$$

at 0.5 C after 100 cycles.

Regarding the non-patent literature, there are publications such as "A graphene wrapped hair-derived carbon/sulfur composite for lithium-sulfur batteries" by Mingpeng Yu et al, 2015, which discloses a hair-derived carbon/sulfur composite used as a sulfur electrode for lithium-sulfur (Li—S) batteries, exhibiting high capacity, good rate capability, and excellent cyclability. Li—S cathodes prepared from biochar derived from human hair showed a gravimetric capacity of $$760\ \frac{\text{mAh}}{\text{g}}$$

at 0.5 C after 100 cycles.

The publications "Sulfur-encapsulated in heteroatom-doped hierarchical porous carbon derived from goat hair for high-performance lithium-sulfur batteries" by Juan Ren et al, 2019, and "A reduced graphene oxide/nitrogen, phosphorus-doped porous carbon hybrid framework as sulfur host for high-performance lithium-sulfur batteries" by Juan Ren et al, 2018, disclose, respectively, goat hair-derived carbons to enhance electrochemical performances for lithium-sulfur batteries; and a N, P dual-doped 3D hierarchical porous hybrid carbon for advanced Li—S batteries based on the combination of reduced graphene oxide (rGO) and goat hair derived biomass carbon (rGO/GPC) by a simple one-pot pyrolysis process. From these publications, it is shown that for the cathodes prepared from biochar derived from goat hair, the electrode capacity obtained at cycle 100 was $$600\ \frac{\text{mAh}}{\text{g}}.$$

Finally, the publication "Preparing Biochars from Cow Hair Waste Produced in a Tannery for Dye Wastewater Treatment" by Jinzhi Song et al, 2021, discloses biochars prepared from cow hair, but does not disclose or suggest that said biocarbon could be used in batteries.

Although the prior art documents disclose electrodes obtained from biochar, these electrodes do not have at least one of high gravimetric capacities or high capacity retention. In addition, despite the prior art discloses that biochar can be obtained from cow hair, it does not describe nor teach how an electrode could be obtained from cow hair biochar nor the electrochemical properties said electrode would have.

Therefore, there is a need to provide a biochar that allows obtaining a positive electrode having high gravimetric capacities and high capacity retention in order to achieve high-performance lithium-sulfur batteries.

SUMMARY OF THE INVENTION

Based on the foregoing considerations, the present invention provides a cow hair-based porous biochar (or biocarbon), a synthesis process for obtaining said biochar, a cow hair-based composite active material, a positive electrode (or cathode) comprising said composite active material, and a method for preparing said positive electrode for a lithium-sulfur battery, wherein said cow hair-based porous biochar allows obtaining said positive electrode having remarkably improved electrochemical properties when compared to the cathodes reported in the prior art and prepared from other porous biochar obtained from other raw materials. Particularly, the positive cathode of the present invention has higher specific gravimetric capacities and capacity retention than those reported in said prior art.

Accordingly, in a first aspect, it is an object of the present application a cow hair-based porous biochar for positive electrodes of lithium-sulfur batteries, wherein said cow hair-based porous biochar comprises:

carbon ranging from 85% to 95% by weight of the biochar; and oxygen ranging from 5% to 15% by weight of the biochar, wherein the carbon is arranged in a three-dimensional matrix defining a porosity for the biochar, and wherein said porosity ranges from 60% to 80% of the total volume of said biochar.

In an embodiment of the cow hair-based porous biochar, said biochar has a pore size between 1 nm and 7 nm, preferably, 3 nm and 5 nm, and more preferably 3.4 nm.

In an embodiment of the cow hair-based porous biochar, said biochar has a specific surface area ranging from $$1000\ \frac{m^2}{g}\ \text{to}\ 2100\ \frac{m^2}{g},$$

preferably from $$1500\ \frac{m^2}{g}\ \text{to}\ 2100\ \frac{m^2}{g},$$

and more preferably from $$1750\ \frac{m^2}{g}\ \text{to}\ 2100\ \frac{m^2}{g}.$$

In a preferred embodiment of the cow hair-based porous biochar, said biochar has a specific surface area of $$2021\ \frac{m^2}{g},$$

and a porosity of 73%.

In an embodiment of the cow hair-based porous biochar, said biochar is obtained from thermal decomposition of cow hair, wherein said cow hair is obtained as waste from the tanning industry.

In a second aspect, it is an object of the present application a synthesis process for obtaining the cow hair-based porous biochar according to the first aspect of the present application, wherein said synthesis process comprises the steps of:

a) washing cow hair;

b) carrying out a heat pretreatment on the washed cow hair obtained from the previous step;

c) chemical activating the heat pretreated cow hair obtained from the previous step using potassium hydroxide (KOH) solution;

d) calcinating the chemical activated cow hair obtained from the previous step, thus obtaining a calcinated mixture of KOH and heat pretreated cow hair; and e) washing the calcinated mixture of KOH and heat pretreated cow hair first with hydrogen chloride (HCl) until neutral pH, to remove the remaining KOH, and then with water to eliminate the HCl excess, thereby obtaining a cow hair-based porous biochar suspension that is then filtered to obtain the cow hair-based porous biochar in the form of powder.

In a preferred embodiment of the synthesis process, the washing of the cow hair comprises introducing the cow hair in a bag and washing said bag in a washing machine; immersing the cow hair in isopropanol with stirring; filtering the cow hair; and drying the cow hair, preferably in a vacuum oven, at a temperature ranging from 50° C. to 90° C.

In a preferred embodiment of the synthesis process, the heat pretreatment comprises a precalcination process that is carried out at low temperatures ranging from 400° C. to 550° C. for 15 to 180 minutes, preferably, 500° C. for 30 minutes, in an inert atmosphere, using a temperature slope ranging from 2 to 10° C./min, preferably, 5° C./min.

In a preferred embodiment of the synthesis process, the chemical activation comprises mixing the heat pretreated cow hair with the KOH solution for a time ranging from 0.5 to 4 hours, preferably 2 hours, at room temperature; and heating this mixture at a temperature ranging from 80° C. to 100° C., preferably 80° C. so that the solvent of the KOH solution evaporates, and the weight of the KOH and heat pretreated cow hair mixture remains constant. In a more preferred embodiment of the synthesis process, the KOH and the heat pretreated cow hair in the mixture are in a ratio ranging from 50:50 to 80:20, preferably 80:20 (KOH:pretreated cow hair).

In a preferred embodiment of the synthesis process, the calcination step is carried out at high temperatures ranging from 700° C. to 1000° C. for 1 to 7 hours, preferably, at 800° C. for 3 hours, and more preferably at 900° C. for 1 hour, in an inert atmosphere.

In a third aspect, it is an object of the present application a cow hair-based porous biochar obtained according to the synthesis process of the second aspect.

In a fourth aspect, it is an object of the present application a cow hair-based composite active material for the preparation of positive electrodes for lithium-sulfur batteries, wherein said composite material comprises:

a cow hair-based porous biochar ranging from 10% to 50% by weight of the composite material, said cow hair-based porous biochar comprising a porosity ranging from 60% to 80%; and elemental sulfur (S) encapsulated within the pores of said biochar, said elemental sulfur ranging from 50% to 90% by weight of the composite material.

In a preferred embodiment of the composite active material, the cow hair-based porous biochar has a pore size between 1 nm and 7 nm, preferably, 3 nm and 5 nm, and more preferably 3.4 nm.

In a fifth aspect, it is an object of the present application a positive electrode for a lithium-sulfur battery, said positive electrode comprising:

the composite active material according to the fourth aspect ranging from 50% to 90% by weight of the positive electrode;

a conductive carbon ranging from 5% to 25% by weight of the positive electrode; and a binder ranging from 5% to 25% by weight of the positive electrode.

In a preferred embodiment of the positive electrode, the conductive carbon is carbon black, preferably, Ketjen Black or carbon Super P.

In a preferred embodiment of the positive electrode, the binder is polyvinylidene fluoride (PVDF).

In an embodiment of the positive electrode, said positive electrode has a gravimetric capacity ranging from $$700\ \frac{mAh}{g}\ \text{to}\ 1000\ \frac{mAh}{g}$$

at cycle 100 of charge and discharge cycles.

In a preferred embodiment of the positive electrode, said positive electrode comprises 80% of composite active material, 10% of binder and 10% of conductive carbon, having a gravimetric capacity of $$799\ \frac{\text{mAh}}{\text{g}}$$

at cycle 100 of charge and discharge cycles.

In a sixth aspect, it is an object of the present application a method for preparing the positive electrode according to the fifth aspect, wherein said method comprises the following steps:

a) carrying out the synthesis process according to the second aspect in order to obtain a cow hair-based porous biochar in the form of powder;

b) infiltrating elemental sulfur into the porous biochar in order to obtain a composite active material; and c) mixing the composite active material together with conductive carbon and a binder to obtain a porous positive electrode.

In a preferred embodiment of the method of the present invention, the infiltration step is carried out by mixing the elemental sulfur with the biochar powder in a ratio ranging from 50:50 to 90:10, preferably 70:30 (S:biochar), said ratios being weight ratios in relation to the total weight of the composite active material.

In a preferred embodiment of the method of the present invention, the infiltration step further comprises homogenizing the mixture of biochar powder with sulfur in a mortar, preferably, in an agate mortar, and then transferring the homogenized mixture to a hydrothermal jar and subjecting said homogenized mixture to a degassing process under vacuum for a certain amount of time, preferably, 2 hours.

In a more preferred embodiment of the method of the present invention, once the degassing process is over, the jar is closed under an inert atmosphere and heat treated at low temperatures. Preferably, the inert atmosphere is obtained by means of Argon gas, and the heat treatment is carried out at a temperature ranging from 150-300° C. for 1 to 10 hours, preferably, 155° C. for 5 hours with a temperature slope ranging from 2 to 10° C./min, preferably, 5° C./min, wherein once the heat treatment is over, the composite active material is obtained.

In an embodiment of the method of the present invention, the composite active material is mixed with the conductive carbon and the binder in the following ratios, 50-90% of composite active material, 5-25% of binder and 5-25% of conductive carbon, wherein said percentages correspond to weight/weight concentrations in relation to the total weight of the mixture, and wherein said mixture is carried out using N-Methyl-2-pyrrolidone (NMP) as solvent. Preferably, the composite active material is mixed with the conductive carbon and the binder in the following ratios 80% of composite active material, 10% of binder and 10% of conductive carbon.

In an embodiment of the method of the present invention, the mixture between the composite active material, the conductive carbon and the binder, carried out in the NMP solvent, results in a slurry which is coated over an aluminum foil using doctor blade coating method, and dried, preferably, at 80° C. for 2 hours, wherein the NMP solvent evaporates with the drying.

In a preferred embodiment of the method of the present invention, the binder is polyvinylidene fluoride (PVDF).

In a preferred embodiment of the method of the present invention, the conductive carbon is carbon black, preferably, Ketjen Black or carbon Super P.

In an embodiment of the method of the present invention, the porous positive electrode obtained has a gravimetric capacity ranging from $$700\ \frac{\text{mAh}}{\text{g}}\ \text{to}\ 1000\ \frac{\text{mAh}}{\text{g}}$$

at cycle 100 of charge and discharge cycles, preferably, $$799\ \frac{\text{mAh}}{\text{g}}$$

at cycle 100 charge and discharge cycles.

In a seventh aspect, it is an object of the present application a positive electrode for a lithium-sulfur battery, wherein said positive electrode is obtained according to the method of the sixth aspect.

DETAILED DESCRIPTION OF THE INVENTION

Figure 1:
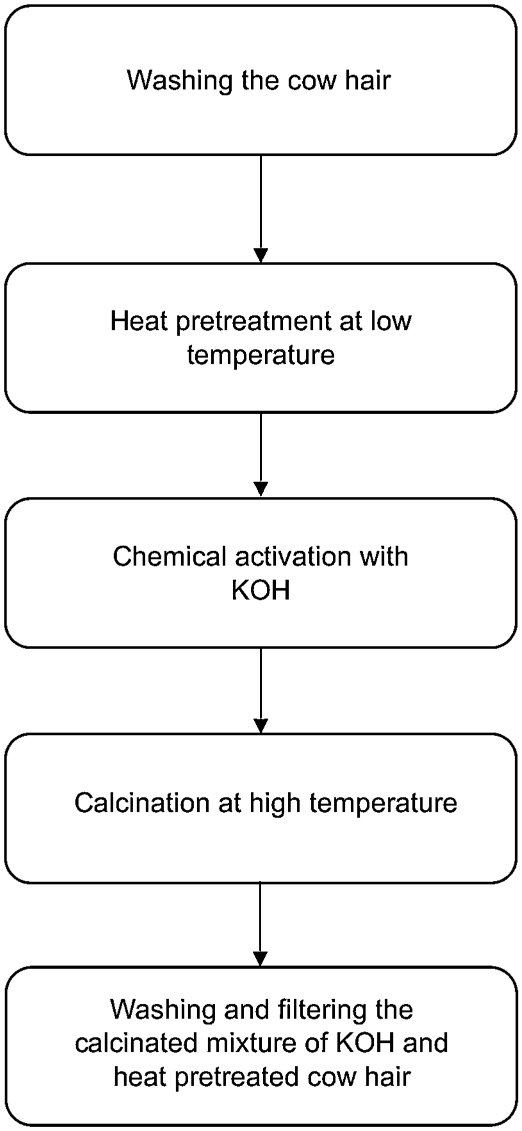
FIG. 1 shows a flowchart of the synthesis process of the present invention.

The cow hair-based porous biochar, the synthesis process for obtaining said biochar, the cow hair-based composite active material, the positive electrode and the method for preparing said positive electrode for a lithium-sulfur battery will be described in detail below.

As used herein, the term "room temperature" refers to a temperature generally comprised between 20° C. and 30° C.

As used herein, the term "active" used in "composite active material" refers to the biochar after being mixed with elemental sulfur, and thus obtaining said composite active material, that has certain properties suitable for use as a cathode as will be understood by a person skilled in the art. In addition, as used herein the term "activated" used in "activated cow hair", "activated sample", "activated material", "activated biochar" or the like, is used to indicate that the cow hair has been subjected to a chemical activation process using KOH solution.

As used herein, the percentages used in relation to the components of the biochar, the composite active material and the positive electrode, refer to weight by weight (i.e., weight/weight or w/w) percentages. For instance, if the biocarbon comprises carbon ranging from 85 to 95% by weight, this means that said carbon represents between 85 and 95% of the total weight of the biocarbon. In addition, and as used herein, the mixing ratios, when referring to how a mixture is obtained, refer to the percentages by weight with respect to the total weight of the mixture. For instance, the mixing ratio 70:30 (S:biochar) regarding the composite active material means that 70% of the total weight of the mixture corresponds to S and 30% of the total weight of the mixture corresponds to the biochar.

The cow hair-based porous biochar comprises carbon ranging from 85% to 95% and oxygen ranging from 5% to 15%, wherein said percentages correspond to weight/weight concentrations in relation to the total weight of the biochar.

The carbon of the cow hair-based porous biochar is arranged in a three-dimensional matrix, that is, a three-dimensional ordered structure, defining a porosity for said biochar, wherein said porosity ranges from 60% to 80% of the total volume of said biochar and has a pore size between 1 nm and 7 nm, preferably, 3 nm and 5 nm, and more preferably 3.4 nm.

Each of the components (carbon and oxygen) of the cow hair-based porous biochar are obtained from the thermal decomposition of cow hair, wherein said cow hair is obtained as waste from the tanning industry and incorporates residues or traces of impurities from said tanning industry that are mostly eliminated during the synthesis process for obtaining said cow hair-based porous biochar, particularly, after the activation process and after the filtration process, which will be described in detail below.

More precisely, the cow hair-based porous biochar of the present invention is obtained in the form of powder by means of a synthesis process shown in FIG. 1, wherein said synthesis process comprises the steps of washing the cow hair; carrying out a heat pretreatment on the washed cow hair; chemical activating the heat pretreated cow hair using potassium hydroxide (KOH) solution; calcinating the chemical activated cow hair; and filtering the obtained calcinated mixture of KOH and heat pretreated cow hair, in order to obtain said cow hair-based porous biochar powder.

The washing of the cow hair comprises introducing the cow hair in a bag and washing said bag in a washing machine preferably for 45 minutes; immersing the cow hair in isopropanol with stirring preferably for 1 hour; filtering the cow hair; and drying the cow hair preferably in a vacuum oven at a temperature ranging from 50° C. to 90° C.

The heat pretreatment comprises a precalcination process that is carried out at low temperatures ranging from 400° C. to 550° C. for 15 to 180 minutes, preferably, 500° C. for 30 minutes, in an inert atmosphere, using a temperature slope ranging from 2 to 10° C./min, preferably, 5° C./min.

The chemical activation of the heat pretreated cow hair comprises mixing the heat pretreated cow hair with the KOH solution (preferably a 8% w/w) in a ratio ranging from 50:50 to 80:20, preferably 80:20 (KOH:pretreated cow hair) for 0.5 to 4 hours, preferably, 2 hours at room temperature; and heating this mixture, preferably in double boiler with water, at a temperature ranging from 80° C. to 100° C., preferably 80° C. so that the solvent of the KOH solution evaporates and the weight of the mixture remains constant, wherein this mixture comprises KOH and the heat pretreated cow hair.

The calcination step is carried out at high temperatures ranging from 700° C. to 1000° C. for 1 to 7 hours, preferably, at 800° C. for 3 hours, and more preferably at 900° C. for 1 hour, in an inert atmosphere.

Once the calcination is over, the calcinated mixture of KOH and heat pretreated cow hair is washed first with hydrogen chloride (HCl) until neutral pH, to remove the remaining KOH, and then with water to eliminate the HCl excess, thereby obtaining a cow hair-based porous biochar suspension that is then filtered to obtain a cow hair-based porous biochar, in the form of pristine powder.

The obtained biochar has a porosity ranging from 60% to 80% of the total volume of said biochar and a pore size between 1 nm and 7 nm, preferably, 3 nm and 5 nm, and more preferably 3.4 nm.

Once obtained the cow hair-based porous biochar, in order to obtain a composite active material for the preparation of positive electrodes for lithium-sulfur batteries, an infiltration step is carried out. This infiltration step comprises infiltrating or impregnating the porous biochar with elemental sulfur (S) by mixing the elemental sulfur with the porous biochar powder in a ratio ranging from 50:50 to 90:10, preferably 70:30 (S:biochar) in order to obtain a cow hair-based porous biochar and sulfur composite active material.

The synthesis process produces a high degree of porosity in the biochar obtained, allowing a greater amount of sulfur to be incorporated, either completely or partially, into the pores of the biochar and in consequence increasing the gravimetric capacity of eventual batteries, the sulfur being thus encapsulated within said pores. More precisely, the chemical activation step of said synthesis process is the step responsible for generating greater porosity in the obtained biochar.

The infiltration step further comprises homogenizing in a mortar, preferably, in an agate mortar, the mixture obtained, that is, the mixture between the porous biochar and the sulfur, and then transferring said mixture to a hydrothermal jar where it will be subjected to a degassing process in vacuum for a certain amount of time, preferably, 2 hours.

Once the degassing process is over, the jar is closed under an inert atmosphere and heat treated at low temperatures. The inert atmosphere is obtained preferably by means of Argon gas, and the heat treatment is carried out at a temperature ranging from 150-300° C. for 1 to 10 hours, preferably, 155° C. for 5 hours with a temperature slope ranging from 2 to 10° C./min, preferably, 5° C./min. In this way, the infiltration step results in a composite active material.

The composite active material obtained through the infiltration step comprises a cow hair-based porous biochar ranging from 10% to 50% by weight of the composite material; and elemental sulfur encapsulated within said cow hair-based porous biochar, said elemental sulfur ranging from 50% to 90% by weight of the composite material. Preferably, the composite active material comprises 26% of cow hair-based porous biochar and 74% of elemental sulfur when the infiltration step comprises mixing the elemental sulfur with the porous biochar powder in a ratio of 70:30 (S:biochar).

Figure 2:
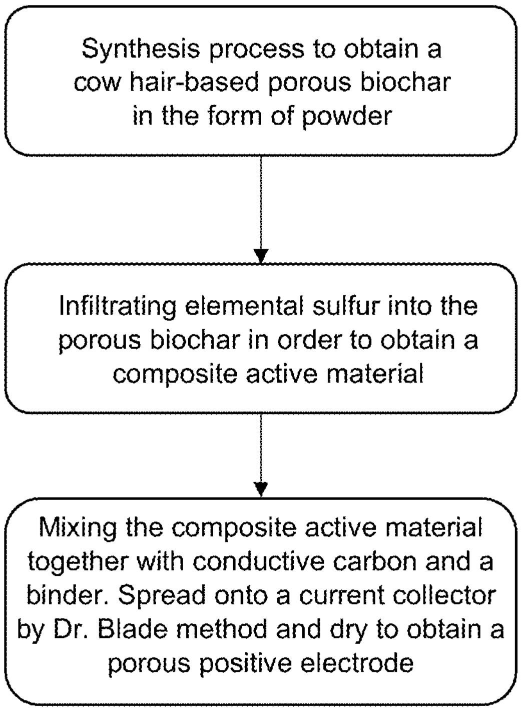
FIG. 2 shows a flowchart of the method for preparing the positive electrode of the present invention.

Once obtained the composite active material, in order to obtain a porous positive electrode for lithium-sulfur batteries said composite material is mixed with conductive carbon and a binder. FIG. 2 shows a flowchart of the method for preparing said positive electrode.

More precisely, the mixture of the active material with the conductive carbon and the binder is carried out, preferably, in the following ratios, 50-90% of composite active material, 5-25% of binder and 5-25% of conductive carbon, wherein said percentages correspond to weight/weight concentrations in relation to the total weight of the mixture, using N-Methyl-2-pyrrolidone (NMP) as solvent, being a preferred ratio 80% of composite active material, 10% of binder and 10% of conductive carbon.

In a preferred embodiment the binder is polyvinylidene fluoride (PVDF) and the conductive carbon is carbon black, preferably, Ketjen Black or carbon Super P.

The mixture carried out in the NMP solvent results in a slurry which is coated over an aluminum foil using doctor blade coating method, and dried, preferably, at 80° C. for 2 hours, wherein the NMP solvent is evaporated with said drying. Once dried, a positive electrode or cathode is obtained.

Therefore, the positive electrode for a lithium-sulfur battery obtained by mixing the active material with the conductive carbon and the binder, comprises cow hair-based porous biochar and sulfur composite material ranging from 50% to 90% by weight, preferably 80%; conductive Super P carbon ranging from 5% to 25% by weight, preferably 10%; and polyvinylidene fluoride as a binder ranging from 5% to 25% by weight, preferably 10%.

The capacities of the positive electrode obtained with the biochar of the present invention are higher than the capacities reported in the prior art using other porous biochar obtained from other raw materials. More precisely, Li—S cathodes prepared from biochar derived from human hair have a gravimetric capacity of $$760 \frac{\text{mAh}}{\text{g}}$$

at cycle number 100, and cathodes prepared from biochar derived from goat hair the electrode capacity at cycle 100 is $$600 \frac{\text{mAh}}{\text{g}},$$

whereas the cathodes prepared from biochar obtained from cow hair, as in the present invention, have a gravimetric capacity ranging from $$700 \frac{\text{mAh}}{\text{g}} \text{ to } 1000 \frac{\text{mAh}}{\text{g}}$$

at cycle 100, preferably a gravimetric capacity of $$799 \frac{\text{mAh}}{\text{g}}$$

at cycle number 100, that is, after an important number of charge-discharge cycles, which shows the superiority of the cow hair-based porous biochar to produce electrodes for Li—S batteries with long life cycle, with respect to other similar known materials of the prior art.

The evaluation of the electrochemical behavior of the positive electrode of the present invention shows that the load capacity obtained for this material is equal to or greater than those known in the prior art. It also shows superior performance in terms of capacity retention with cycling, showing 66% capacity retention at cycle 100, while in the prior art for biochar derived from human hair the capacity retention at cycle 100 is 60%, and for biochar derived from goat hair the capacity retention is 63% at cycle 100.

It should be noted that the high gravimetric capacity and the high capacity retention mentioned above, that are achieved when using the positive electrode obtained by the method of the present invention, allow high-performance lithium-sulfur batteries.

As described above, the cow hair used to obtain the biochar and, consequently, the electrode of the present invention, is obtained as waste from the tanning industry, wherein said cow hair incorporates residues from the tanning industry treatment, and wherein the residues are eliminated during the synthesis process. Particularly, the biochar obtained has a high porosity, which allows to encapsulate a high amount of sulfur and thus improving remarkably the electrochemical properties of the obtained cathode and the cyclability.

Experimental Results

Various tests were carried out to determine the best conditions for carrying out the methods of the present invention.

The heat pretreatment step of the synthesis process was carried out at two different temperatures for two equivalent cow hair samples, wherein said heat pretreatment step consisted of a precalcination process at low temperatures.

A first precalcination process was carried out at 400° C. for 3 hours for one of the cow hair samples, and a second precalcination process was carried out at 500° C. for 30 min for the remaining cow hair sample, both in an inert atmosphere. The materials obtained in both cases were characterized by sortometry (BET), X-ray diffractometry (XRD) and thermogravimetry (TGA).

Figure 3A:
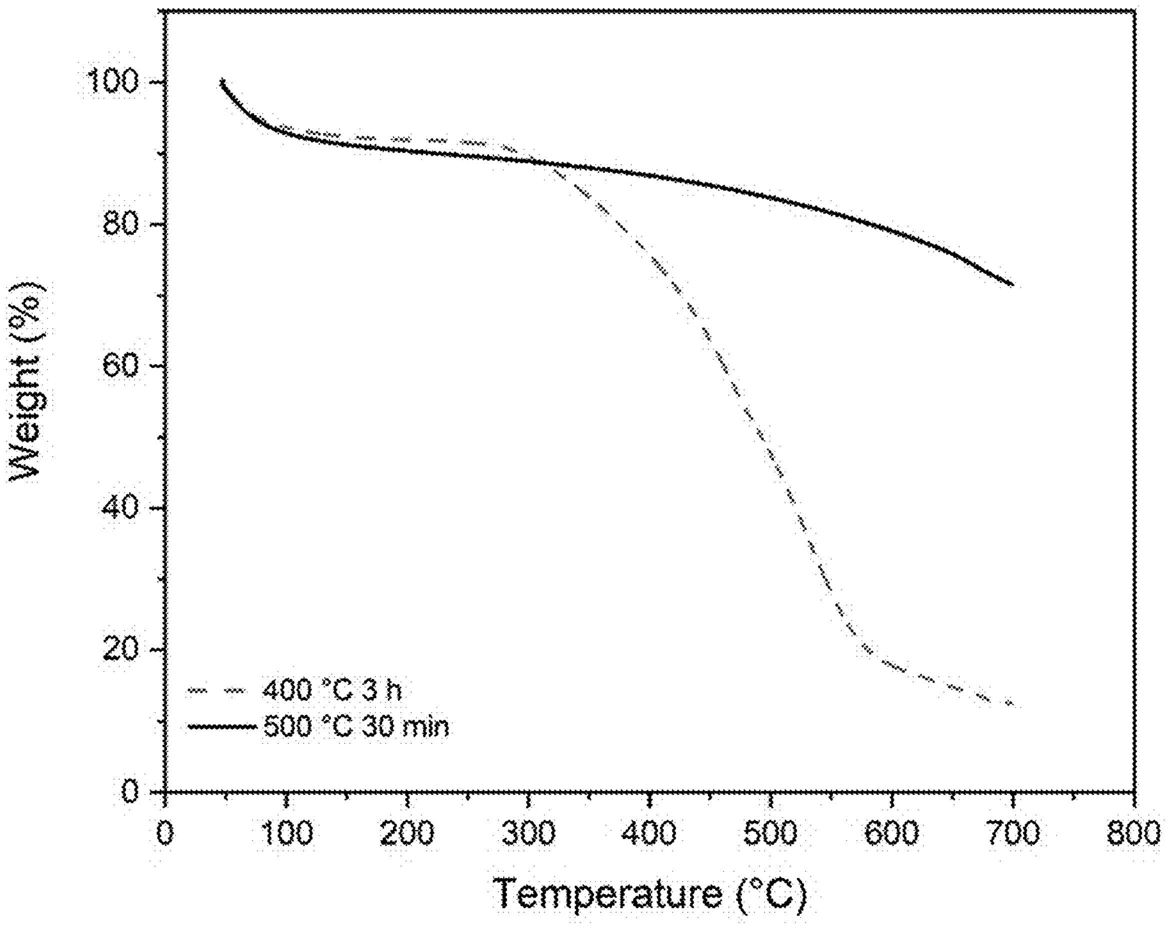
FIGS. 3A and 3B show thermogravimetry results and X-ray diffractometry results, respectively, for cow hair samples treated at different temperatures.
Figure 3B:
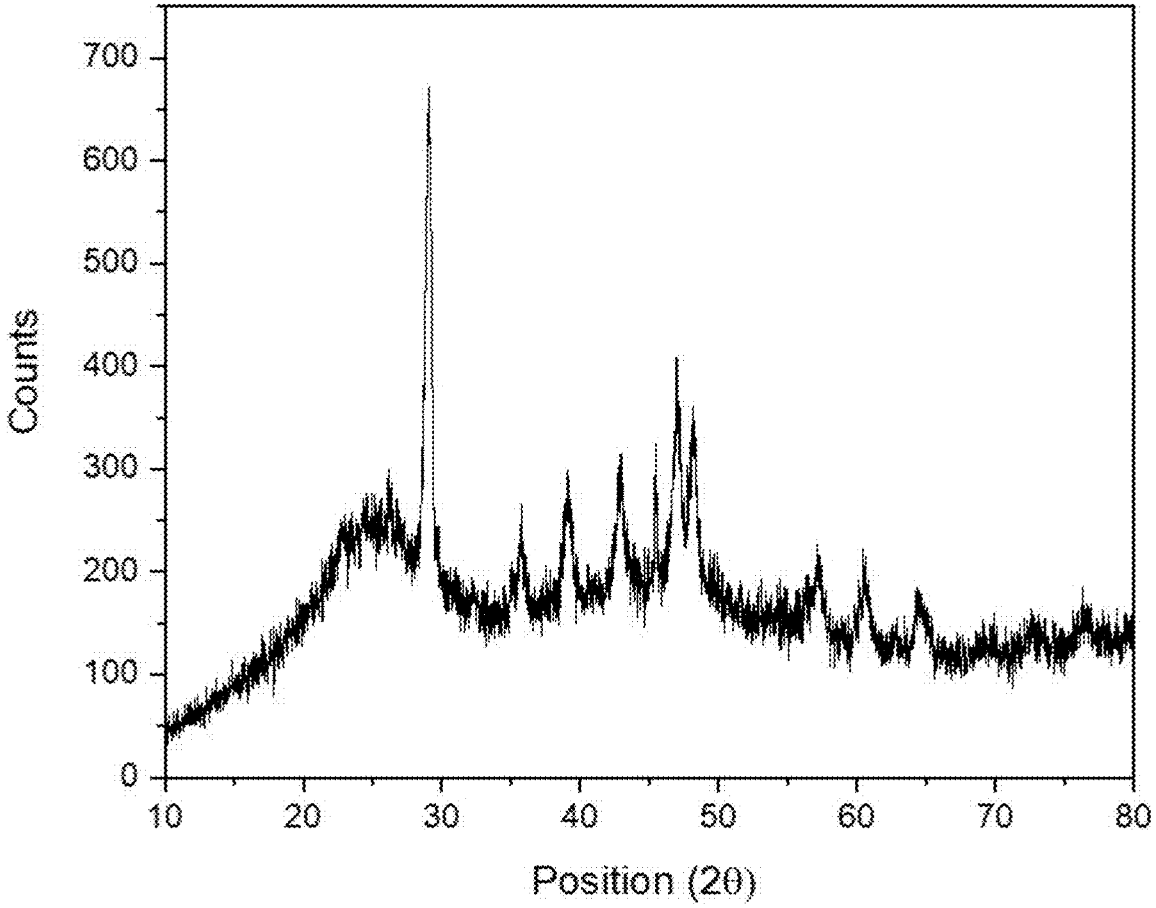

The results of the sortometry are shown in Table 1 below, and the results of the thermogravimetry and the X-ray diffractometry are shown in FIGS. 3A and 3B, respectively, wherein FIG. 3B only shows the XRD for the sample treated at 500° C. for 30 min.

TABLE 1

| Sample | 400° C./3 hours | 500° C./30 min |
|---|---|---|
| BET Area | 0.0877 $m^2/g$ | 2.1660 $m^2/g$ |
| Pore size | — | 6.6044 |

As can be seen from Table 1, the sample treated at 500° C. for 30 minutes not only presents a larger specific surface area (BET area) compared to the sample treated at 400° C. for 3 hours, but also shows the effective formation of mesopores in the material. This increase in the BET area can be associated with the elimination of organic molecules, through ring-opening and dehydration processes, wherein said processes result from the precalcination. These observations are confirmed by means of the thermogravimetric measurements (FIG. 3A), where the sample treated at 400° C. shows mass losses during the measurement at temperatures around 450° C.

The diffractogram (FIG. 3B) of the sample treated at 500° C. for 30 min without the activation step with KOH present the peaks corresponding to the formation of carbonaceous phases and a series of auxiliary peaks, associated with the traces of impurities. The latter results from the residues of the tanning industry processes.

Due to the results described above, it is obvious that carrying out the precalcination process at 500° C. for 30 min, in an inert atmosphere, leads to better results.

Once the precalcination process conditions were selected, the effect of chemical activation was evaluated through the comparison of a non-activated sample and an activated sample. Regarding the latter, said sample was chemically activated by mixing the pretreated cow hair with KOH in solution (8% w/w) and heating for 2 hours to evaporate the solvent. The KOH solution and the heat pretreated cow hair were mixed in a ratio of 80:20 (KOH:pretreated cow hair).

Both samples were then subjected to another calcination process, according to the penultimate step of the synthesis process of the present invention, at 900° C. for 1 hour in an inert atmosphere.

A physicochemical characterization of both samples, that is, the non-activated and activated samples, was carried out. The results obtained from said physicochemical characterization are shown in Table 2 (BET results) and in FIGS. 4A and 4B corresponding to the X-ray diffractometric results and Raman spectroscopic results, respectively.

TABLE 2

| Sample | Non-activated | Activated |
|---|---|---|
| BET Area | 25 $m^2/g$ | 2021 $m^2/g$ |
| Pore size | 9.6 nm | 3.4 nm |

As can be seen from the comparison in Table 2. The chemical activation process not only increases the area of the powders, but also their porosity, reducing the pore size to a third of the value obtained for the non-activated sample.

Figure 4A:
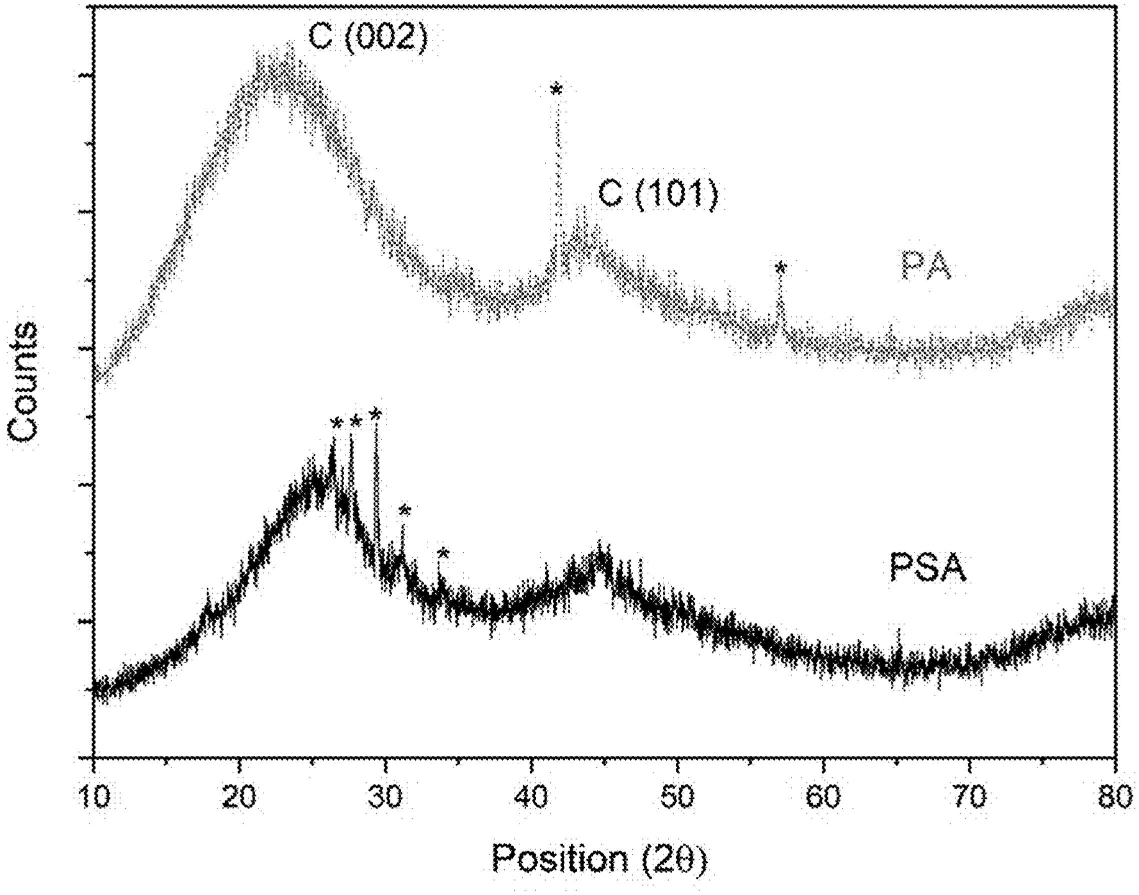
FIGS. 4A and 4B show X-ray diffractometry results and Raman spectroscopy results, respectively, for an activated sample (PA) and a non-activated sample (PSA).

In FIG. 4A, the diffractograms of both samples are similar, presenting the peaks corresponding to the formation of carbonaceous phases and a series of auxiliary peaks, associated with the traces of impurities. The latter results from the residues of the tanning industry processes.

The comparison of the results obtained by means of X-ray diffraction in FIG. 4A show that both samples present the characteristic signals of the 002 and 100 carbon planes. It should be noted that the atomic planes of a crystal cause incident beams of X-rays to interfere with each other as they leave the crystal, and that the signals 002 and 100 are characteristic of carbon graphitic planes.

There are two relevant aspects in the results shown in FIG. 4A, the first aspect is that there is a shift of the signal corresponding to the 002 plane of the carbon towards smaller angles when the chemical activation of the sample is carried out; and the second aspect is that the non-activated sample shows a greater number of signals, marked with an asterisk (*), associated with the presence of traces of impurities.

The shift of the signal towards lower angles can be associated with a change in the interplanar distance of the graphite. Considering the equation $$d = \frac{\lambda}{(2sen\theta)}$$

wherein d is the interplanar distance or spacing, λ is the wavelength of XRD radiation, and θ is the Bragg angle, and wherein a shift towards smaller angles, that is a low value for θ, corresponds to a greater interplanar spacing (d), which is consistent with the greater surface area (BET area) obtained.

The presence of a greater number of impurity signals is associated, as mentioned above, with the formation of traces of carbonates and calcium oxide in the sample. These signals are less evident in the activated sample, since it undergoes two washing processes, one during the activation itself in potassium hydroxide (KOH) solution and the other during the removal of KOH with hydrogen chloride (HCl) after the calcination step at high temperatures, thereby showing that impurities such as oxides and carbonates are removed from the biochar during the chemical activation process and the filtration process.

Figure 4B:
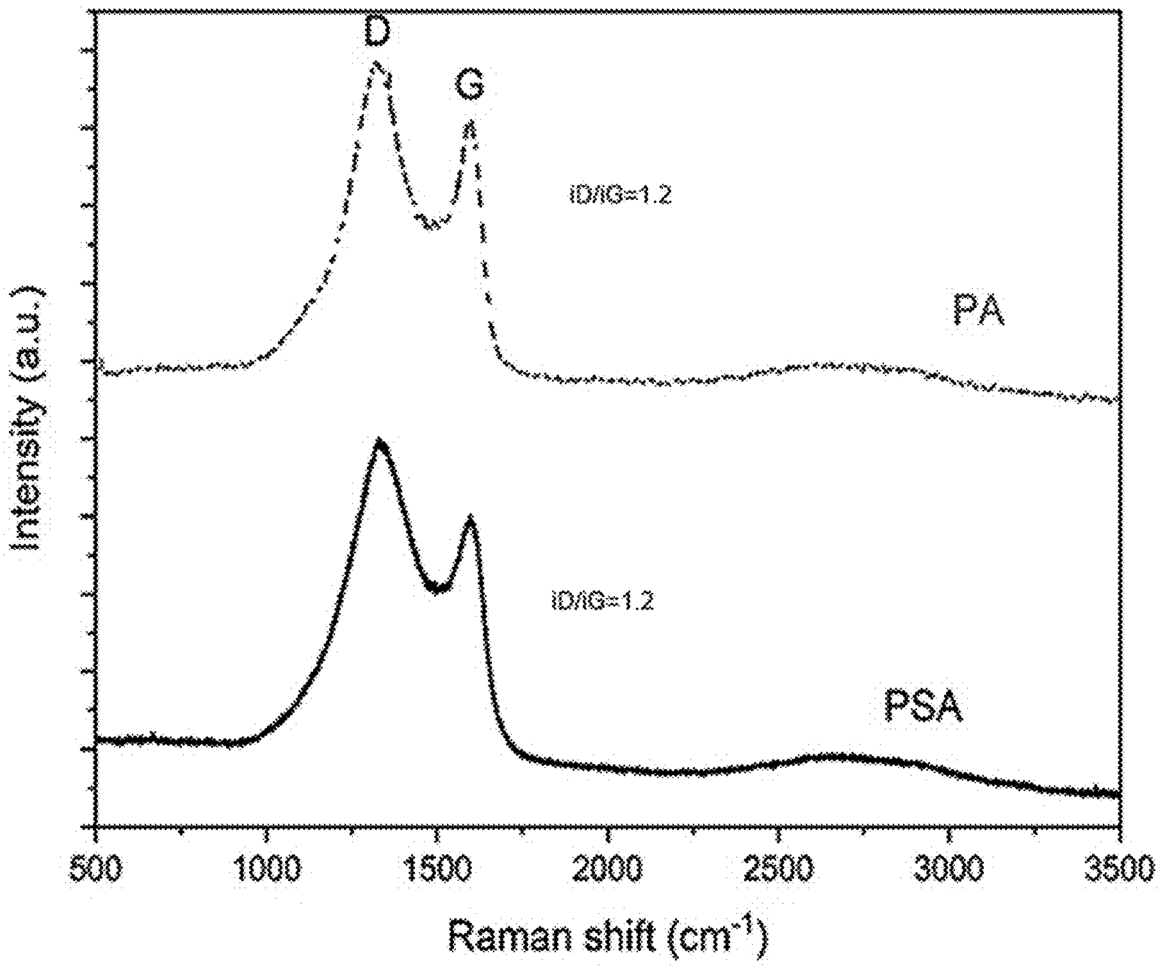

Finally, the degree of graphitization of the samples was evaluated by analyzing the Raman spectra in FIG. 4B, where it can be seen that there are no differences in the degree of graphitization, thereby concluding that the chemical activation process affects the BET area of the biochar obtained, but not the presence of defects in the structure. It should be noted that in said FIG. 4B, the D peaks correspond to disordered carbon structures and the G band corresponds to the graphitized order carbon structure within the material; and the ID/IG ratio (Raman intensity ratio) is a measure of perfect, imperfect, and disordered structure of carbon materials.

Next, the biochar with activation (PA) and the biochar without activation (PSA) were impregnated with sulfur (S) by mixing the pristine powders of said activated biochar and non-activated biochar in ratios 70:30 (S:biochar). The mixture was first homogenized in an agate mortar and then transferred to a hydrothermal jar.

After degassing for 2 hours in vacuum, the jar was closed under Argon (Ar) atmosphere and treated at 155° C. for 5 hours (temperature slope: 5° C./min). The infiltrated materials that is, the sample without activation (PSA+S) and the sample with activation (PA+S), were used to prepare the positive electrodes (cathodes). Briefly, the active materials (the infiltrated materials) were each mixed with polyvinylidene fluoride (PVDF), and Ketjen Black, in a relation 80:10:10, using N-Methyl-2-pyrrolidone (NMP) as solvent, wherein the relation 80:10:10 corresponds to 80% of composite active material, 10% of polyvinylidene fluoride and 10% of Ketjen Black, and wherein said percentages correspond to weight/weight concentrations in relation to the total weight of the mixture. The slurry was coated over an aluminum foil using doctor blade coating method and dried at 80° C. for 2 h.

Figure 5A:
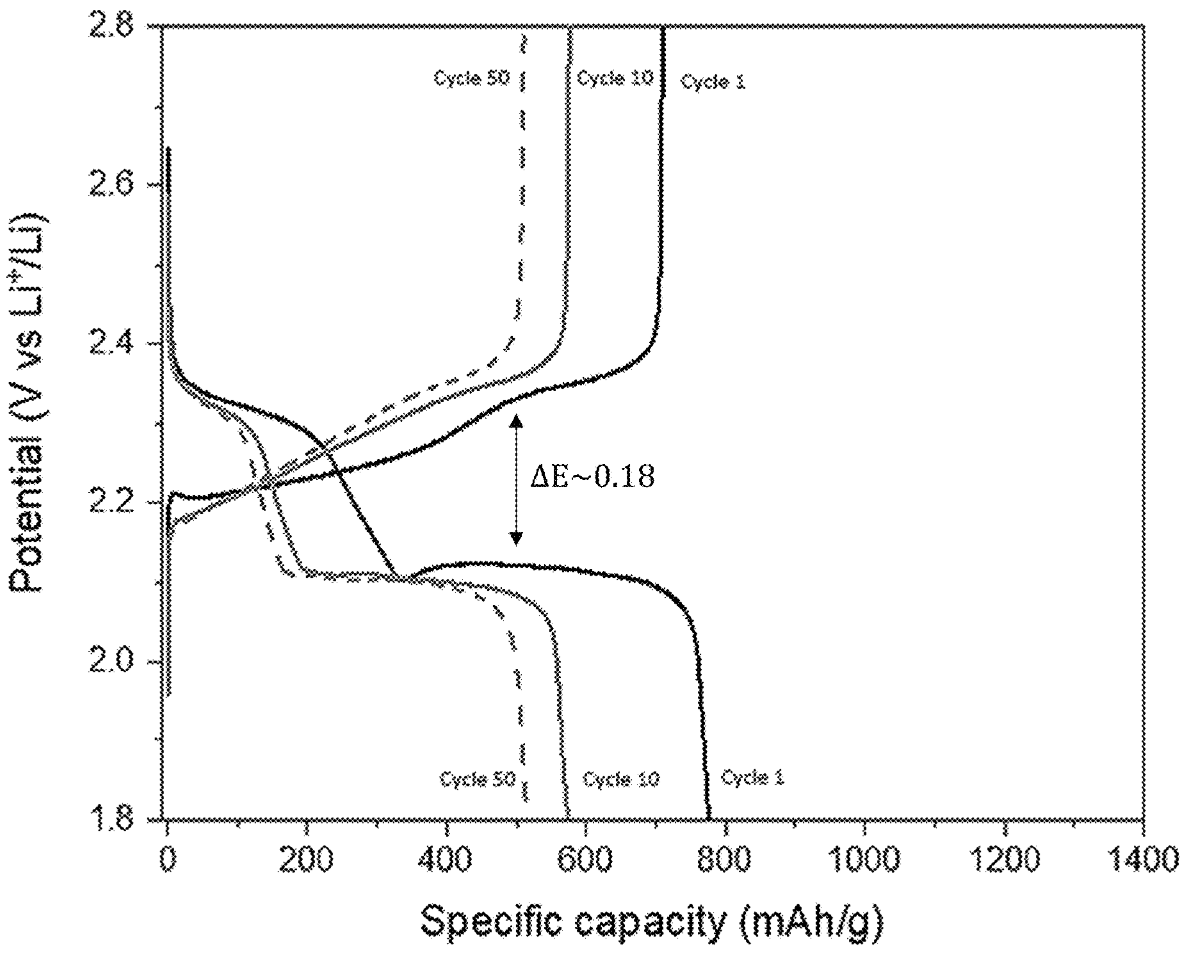
FIGS. 5A and 5B show the charge/discharge cycle numbers 1, 10 and 50 for cells assembled with cathodes obtained from biochar without activation and sulfur (PSA+S) and biochar with activation and sulfur (PA+S), respectively.
Figure 5B:
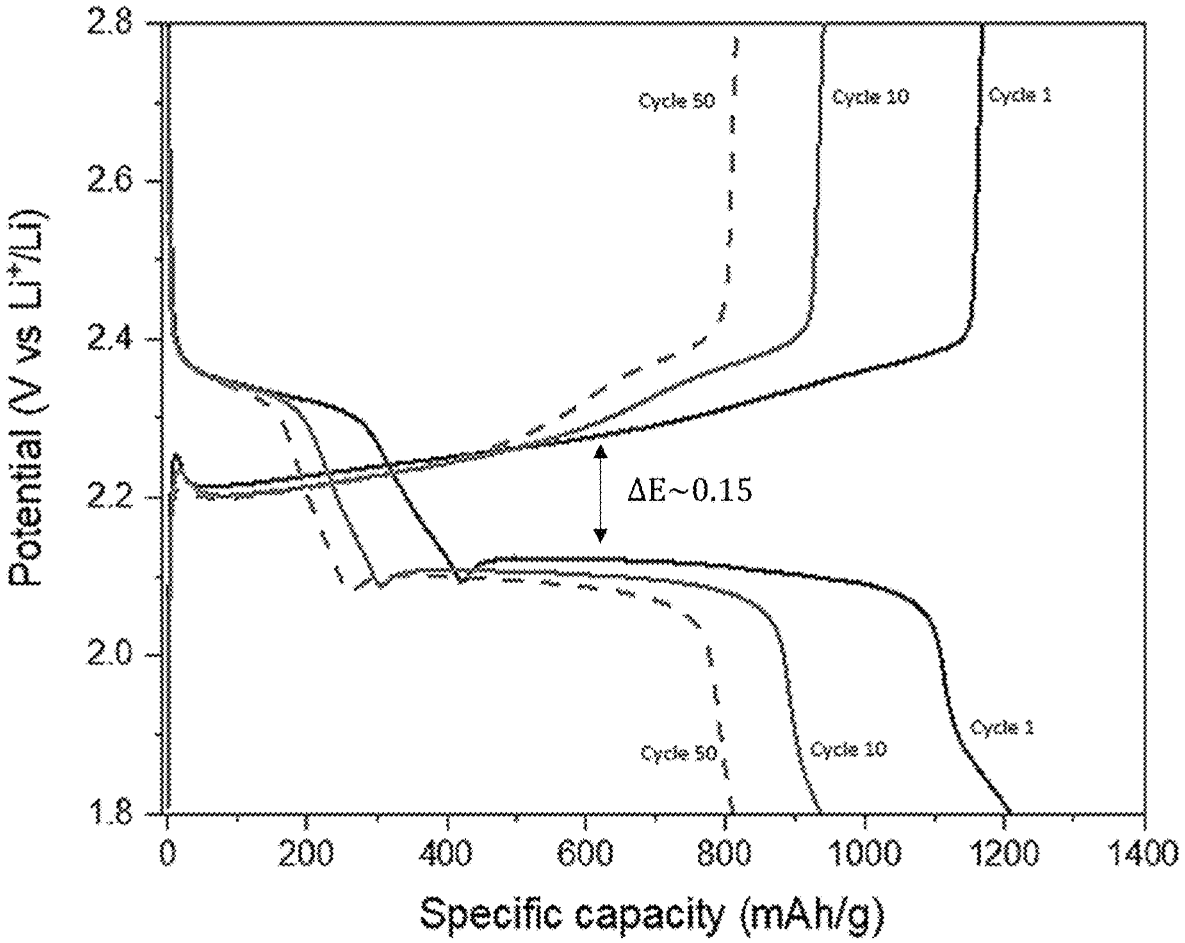

Electrochemical tests were carried out in CR2032 type cells using metal lithium as reference and counter electrode, celgard 2325 as separator and 1M Lithium bis(trifluoromethanesulfonyl)imide (LiTFSI)+0.25 M Lithium nitrate ($LiNO3$) in 1:1 mixture of 1,3-dioxolane (DOL) and dimethyl ether (DME) as electrolyte. The used electrolyte was determined as 20 μL per milligram of S. The applied currents were calculated as a function of the mass of sulfur present in each electrode FIGS. 5A and 5B show galvanostatic charge/discharge tests with charge and discharge profiles at 0.1 $A/g_s$. Hereinafter, the units $A/g_s$ or A/g will be used interchangeably, referring in both cases to ampere per gram of sulfur.

More precisely, FIG. 5A shows the charge/discharge cycle numbers 1, 10 and 50 for a cell assembled with the cathode obtained from PSA+S material (FIG. 5A), that is, from the non-activated cow hair biocarbon containing sulfur; and FIG. 5B shows the charge/discharge cycle numbers 1, 10 and 50 for a cell assembled with the cathode obtained from PA+S material (FIG. 5B), that is, from the activated cow hair biocarbon containing sulfur.

FIGS. 5A and 5B show that the overpotential (ΔE) resulting from polarization caused by electrochemical reactions is higher for non-activated samples. This indicates a higher resistance and slower lithium ion diffusivity in the PSA+S material (i.e., the non-activated cow hair biocarbon containing sulfur) during charge/discharge reactions.

Figure 6:
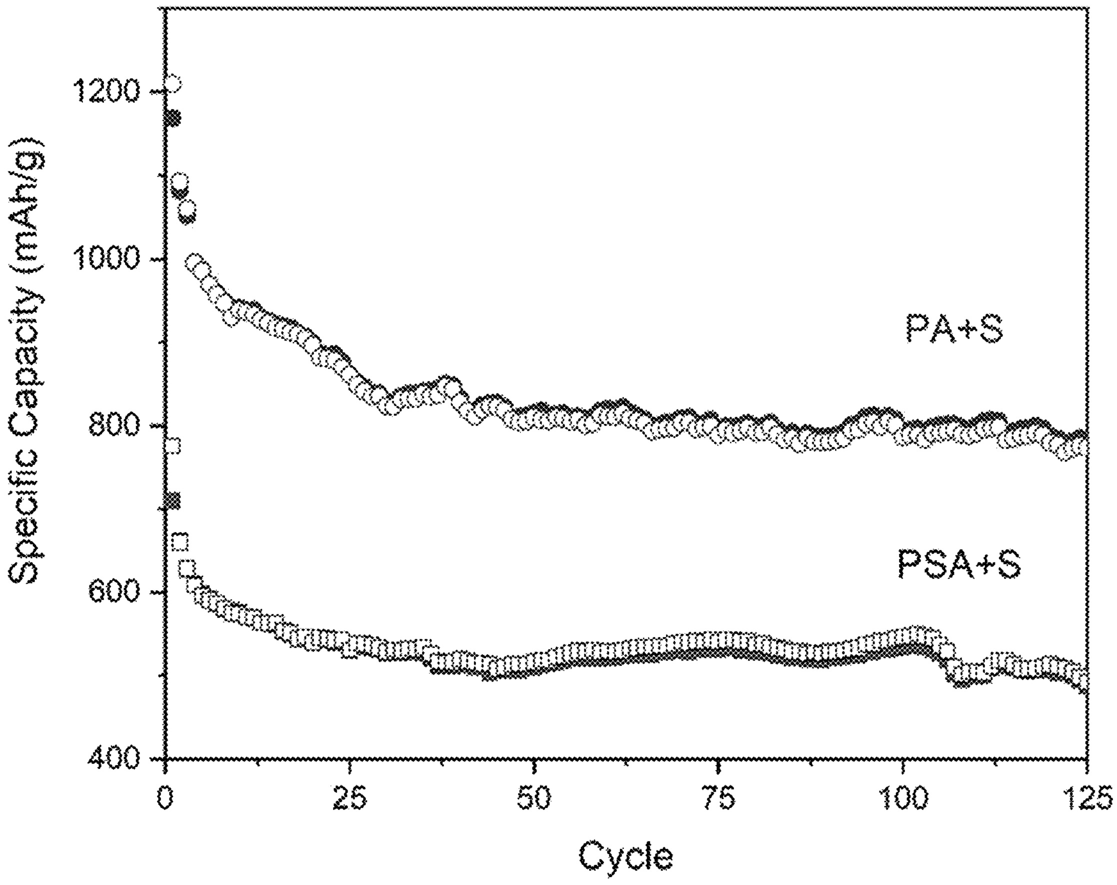
FIG. 6 shows graphs of capacity vs. cycle number obtained at 0.1 A/$g_s$ for cells assembled with cathodes obtained from biochar without activation and sulfur (PSA+S) and biochar with activation and sulfur (PA+S).

From the galvanostatic profiles obtained, the cyclability of the batteries was evaluated. To this end, the capacity was plotted as a function of the number of cycles. The results obtained for each cathode sample are shown in FIG. 6, which shows graphs of capacity vs. cycle number obtained at 0.1 $A/g_s$ for cells assembled with the cathode obtained from PA+S material and with the cathode obtained from PSA+S material. More precisely, FIG. 6 shows that the cathode obtained from PA+S material (i.e., the cathode obtained from activated cow hair biocarbon containing sulfur) can achieve prolonged and stable cycle life with a capacity retention as high as $$799\ \frac{\mathrm{mAh}}{\mathrm{g}}$$

after 100 cycles, while the capacity of the cathode obtained from PSA+S material (i.e., the cathode obtained from non-activated cow hair biocarbon containing sulfur) is about $$500\ \frac{\mathrm{mAh}}{\mathrm{g}}$$

after 100 cycles.

From the results shown in FIGS. 5A, 5B and 6, it can be concluded that all the materials present a good impregnation of sulfur, since they have the plateaus at the potential values that correspond to the reactions of sulfur with lithium. Likewise, no differences are observed in the potential values for each case. The most significant differences are reflected in FIG. 6, where it can be seen that the activated sample has both a higher initial capacity and a better retention of the capacity with cycling. These results can be explained by the greater surface area and the high content of pores, where the sulfur is confined, of the cathode obtained from PA+S material, evidencing the so-called "shuttle effect", that is, the diffusion back and forward of polysulfides between anode and cathode during cycling that is responsible for the loss of capacity with cycling.

Figure 7A:
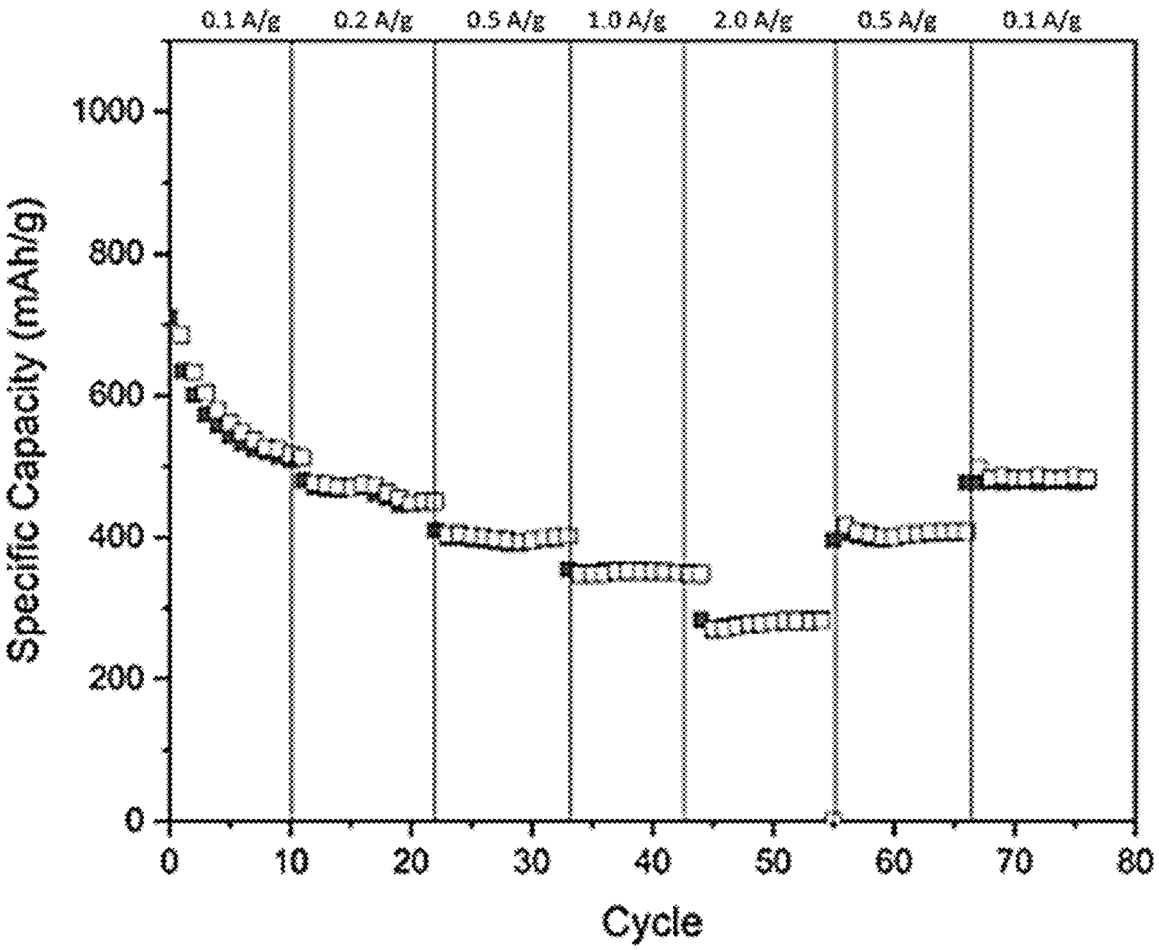
FIGS. 7A and 7B show graphs of capacity vs. cycle number obtained at different current densities for cells assembled with cathodes obtained from PSA+S and PA+S, respectively.
Figure 7B:
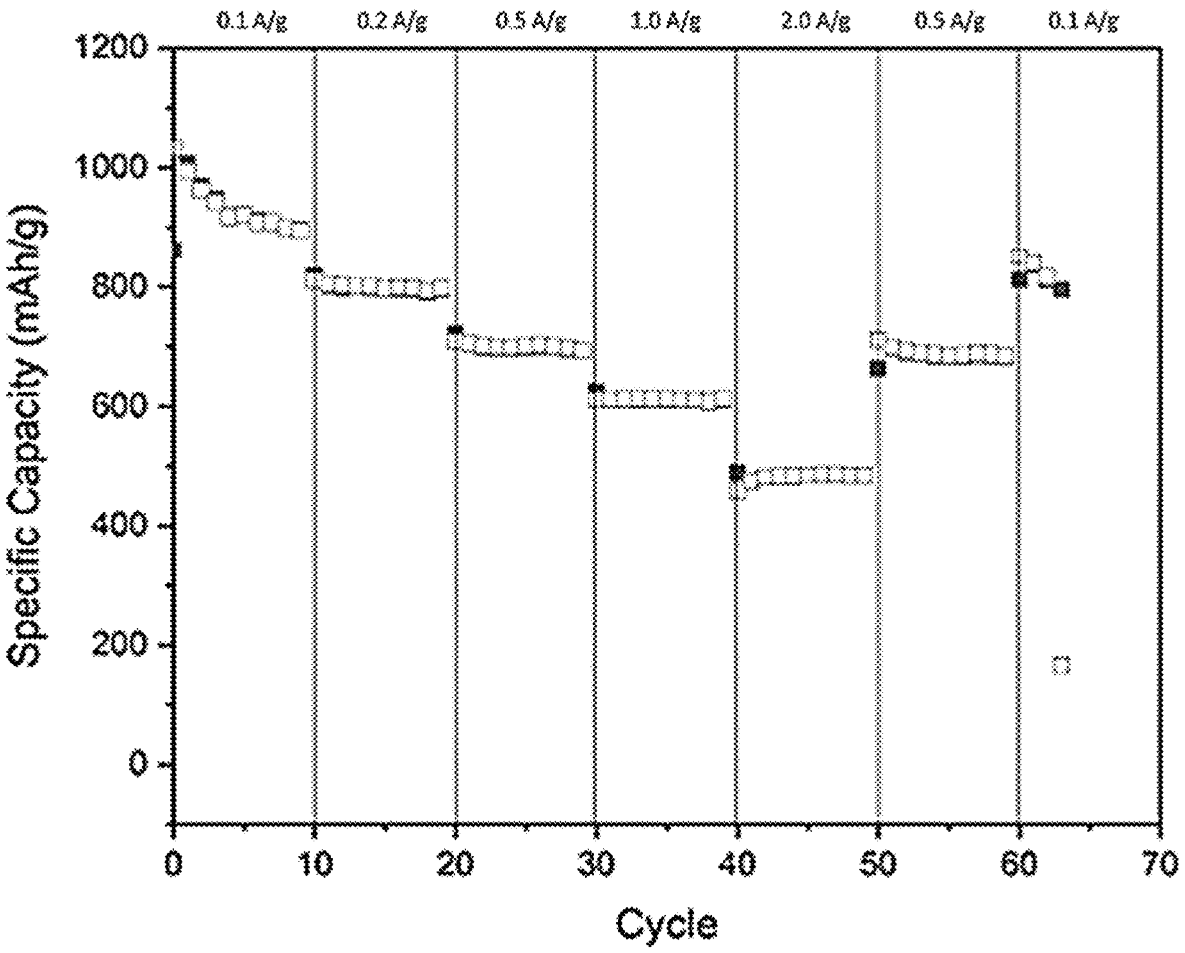

In a complementary way to the cyclability, it was evaluated how the capacity varies when the charging/discharging current of the electrodes is varied. The results obtained for the different cathodes are shown in FIGS. 7A and 7B. With these tests, the cell was taken to a more realistic and forced situation.

FIGS. 7A and 7B show graphs of capacity vs. cycle number obtained at different current densities (A/g) for cells assembled with cathodes obtained from PSA+S (FIG. 7A) and PA+S (FIG. 7B). For both graphs of FIGS. 7A and 7B the white squares correspond to the specific capacity during charge cycles and the black squares correspond to the specific capacity during discharge cycles.

Regarding FIG. 7B, the cathode obtained from PA+S displayed excellent rate capability and non-memory effect, as evaluated by increasing the current densities from 0.1 A/g to 2.0 A/g and then decreasing it back to 0.5 A/g and 0.1 A/g. When the current density was switched back to 0.5 A/g and 0.1 A/g, the reversible capacities of about $$680\ \frac{\mathrm{mAh}}{\mathrm{g}}$$

and about $$810\ \frac{\mathrm{mAh}}{\mathrm{g}}$$

were recovered and remained stable showing an excellent reversibility and good stability of the cathodes prepared with activated biocarbon.

The results show that the higher capacity and the better retention, observed in cyclability, also translate into a better electrochemical response at higher current densities. Additionally, the results obtained do not show considerable differences neither in the work potentials of the cell, nor in the specific capacity values. For these reasons, the cathode material PA+S is appropriate for use in Li—S batteries.

Therefore, throughout the different tests, biochars were synthesized with cow hair. These biochars managed to be efficiently characterized through BET studies, to determine their surface area and porosity; X-ray diffraction and Raman spectroscopy. In addition, the systematic variation of the obtained parameters made it possible to optimize the synthesis conditions in each case, achieving microporous biochars with a larger area. The specific surface areas of the biocarbons obtained were above $$2021\ \frac{\mathrm{m}^2}{\mathrm{g}}$$

(being this BET area associated to a porosity of 73%), which is a very competitive value with that obtained in known similar systems. On the other hand, the average pore diameter for the biochar sample was around 3 nm, this being the main objective sought, since micropores are required to achieve a good performance of the cathode in the Li—S cell.

Regarding the infiltration step, it was possible to efficiently infiltrate the obtained samples with sulfur. The electrochemical performance, evaluated through the assembly of button cells, showed initial capacities between $$1000-1200\ \frac{\mathrm{mAh}}{\mathrm{g}}.$$

The invention claimed is:

1. A cow hair-based composite active material for the preparation of positive electrodes for lithium-sulfur batteries, wherein said cow hair-based composite active material comprises:

a cow hair-based porous biochar ranging from 10% to 50% by weight of the composite material, said cow hair-based porous biochar comprising a porosity ranging from 60% to 80%; and elemental sulfur(S) encapsulated within said cow hair-based porous biochar, said elemental sulfur ranging from 50% to 90% by weight of the cow hair-based composite active material.

2. A positive electrode for a lithium-sulfur battery, said positive electrode comprising:

the cow hair-based composite active material according to claim 1 ranging from 50% to 90% by weight of the positive electrode;

a conductive carbon ranging from 5% to 25% by weight of the positive electrode; and a binder ranging from 5% to 25% by weight of the positive electrode.

3. The positive electrode according to claim 2, wherein the binder is polyvinylidene fluoride (PVDF).

4. The positive electrode according to claim 2, wherein positive electrode has a gravimetric capacity ranging from $$700\ \frac{\text{mAh}}{\text{R}}\ \text{to}\ 1000\ \frac{\text{mAh}}{\text{R}}$$

at cycle 100 of charge and discharge cycles.

5. The positive electrode according to claim 2, wherein said positive electrode comprises 80% of composite active material, 10% of binder and 10% of conductive carbon, having a gravimetric capacity of $$799\ \frac{\text{mAh}}{\text{R}}$$

at cycle 100.

6. A method for preparing a positive electrode for a lithium-sulfur battery, wherein said method comprises the following steps:

providing the cow hair-based composite active comprising:

a cow hair-based porous biochar ranging from 10% to 50% by weight of the composite material, said cow hair-based porous biochar comprising a porosity ranging from 60% to 80%; and elemental sulfur(S) encapsulated within said cow hair-based porous biochar, said elemental sulfur ranging from 50% to 90% by weight of the cow hair-based composite active material; and mixing the cow hair-based composite active material according to claim 1 together with conductive carbon and a binder to obtain a porous positive electrode.

7. The method according to claim 6, wherein the step of providing the cow hair-based composite active material comprises infiltrating by mixing elemental sulfur into a cow hair-based porous biochar in a weight ratio ranging from 50:50 to 90:10 (S: biochar).

8. The method according to claim 7, wherein the infiltration step further comprises homogenizing the mixture of biochar powder with sulfur in a mortar, preferably, in an agate mortar, and then transferring the homogenized mixture to a hydrothermal jar and subjecting said homogenized mixture to a degassing process under vacuum for a certain amount of time, preferably, 2 hours.

9. The method according to claim 8, wherein once the degassing process is over, the jar is closed under an argon inert atmosphere and heat treated at a temperature ranging from 150-300° C. for 1 to 10 hours with a temperature slope ranging from 2 to 10° C./min, wherein once the heat treatment is over, the composite active material is obtained.

10. The method according to claim 6, wherein the composite active material is mixed with the conductive carbon and the binder in the following relations, 50-90% of composite active material, 5-25% of binder and 5-25% of conductive carbon, wherein said percentages correspond to weight/weight concentrations in relation to the total weight of the mixture, and wherein said mixture is carried out using N-Methyl-2-pyrrolidone (NMP) as solvent.

* * * * *